US008622816B2

(12) United States Patent
Gagner et al.

(10) Patent No.: US 8,622,816 B2
(45) Date of Patent: Jan. 7, 2014

(54) LIVING WAGERING GAMES

(75) Inventors: Mark B. Gagner, West Chicago, IL (US); Damon E. Gura, Chicago, IL (US); Jeremy M. Hornik, Chicago, IL (US); Richard T. Schwartz, Chicago, IL (US)

(73) Assignee: WMS Gaming, Inc, Waukegan, IL (US)

( * ) Notice: Subject to any disclaimer, the term of this patent is extended or adjusted under 35 U.S.C. 154(b) by 0 days.

(21) Appl. No.: 12/996,748

(22) PCT Filed: Jun. 10, 2009

(86) PCT No.: PCT/US2009/046871

§ 371 (c)(1), (2), (4) Date: Dec. 7, 2010

(87) PCT Pub. No.: WO2009/152226

PCT Pub. Date: Dec. 17, 2009

(65) Prior Publication Data

US 2011/0092275 A1 Apr. 21, 2011

Related U.S. Application Data

(60) Provisional application No. 61/060,963, filed on Jun. 12, 2008.

(51) Int. Cl.

| | |
|---|---|
| ***A63F 9/24*** | (2006.01) |
| ***A63F 13/00*** | (2006.01) |
| ***G06F 17/00*** | (2006.01) |
| ***G06F 19/00*** | (2011.01) |

(52) U.S. Cl.

USPC .................. 463/25; 463/40; 463/41; 463/42; 463/43; 700/91

(58) Field of Classification Search

USPC .................................. 463/25, 40–43; 700/91

See application file for complete search history.

(56) References Cited

U.S. PATENT DOCUMENTS

| | | | | |
|---|---|---|---|---|
| 5,876,284 | A * | 3/1999 | Acres et al. | 463/25 |
| 7,364,509 | B2 * | 4/2008 | Slade | 463/40 |
| 2002/0068633 | A1 * | 6/2002 | Schlaifer | 463/43 |
| 2005/0049731 | A1 * | 3/2005 | Dell | 700/91 |
| 2005/0239549 | A1 * | 10/2005 | Salvatore et al. | 463/42 |
| 2006/0183547 | A1 * | 8/2006 | McMonigle | 463/40 |
| 2006/0217198 | A1 * | 9/2006 | Johnson | 463/40 |

FOREIGN PATENT DOCUMENTS

WO WO2009152226 12/2009

OTHER PUBLICATIONS

"PCT Application No. PCT/US09/46871 International Search Report", Aug. 3, 2009 , 9 pages.

"PCT Application No. PCT/US09/46871 International Preliminary Report on Patentability", Sep. 8, 2010 , 13 pages.

* cited by examiner

*Primary Examiner* — David L Lewis
*Assistant Examiner* — Adetokunbo O Torimiro
(74) *Attorney, Agent, or Firm* — DeLizio Gilliam, PLLC

(57) ABSTRACT

A system can invigorate wagering games with dynamic updates to reflect changes in ongoing current events. Current real-life data about at least one of a current event and a public figure are acquired. Game data for a wagering game are updated based, at least in part, on the acquired current real-life data. A plurality of wagering game machines that host instances of the wagering game are determined. The updated game data is indicated over a network to the plurality of wagering game machines that host instances of the wagering games.

26 Claims, 8 Drawing Sheets

LIVING WAGERING GAMES

RELATED APPLICATIONS

This application claims the priority benefit of U.S. Provisional Application Ser. No. 61/060,963 filed Jun. 12, 2008.

LIMITED COPYRIGHT WAIVER

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2009, WMS Gaming, Inc.

FIELD

Embodiments of the inventive subject matter relate generally to wagering game systems, and more particularly to wagering game systems that reflect current events.

BACKGROUND

Wagering game machines, such as slot machines, video poker machines and the like, have been a cornerstone of the gaming industry for several years. Generally, the popularity of such machines depends on the likelihood (or perceived likelihood) of winning money at the machine and the intrinsic entertainment value of the machine relative to other available gaming options. Where the available gaming options include a number of competing wagering game machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for wagering game machine manufacturers to continuously develop new games and gaming enhancements that will attract frequent play.

SUMMARY

In some embodiments, a method comprises acquiring current real-life data about at least one of a current event and a public figure; updating game data for a wagering game based, at least in part, on the acquired current real-life data; determining a plurality of wagering game machines that host instances of the wagering game; and indicating over a network the updated game data to the plurality of wagering game machines that host instances of the wagering game.

In some embodiments, the method further comprises collecting the current real-life data.

In some embodiments, the method further comprises selecting the wagering game from a plurality of wagering games.

In some embodiments, the updated game data comprises at least one of aesthetic game data, mathematical data, wagering game logic data, and statistical data.

In some embodiments, the method further comprises determining if a protected asset that corresponds to the current real-life data is available, wherein said updating the game data includes indicating the protected asset for use in the instances of the wagering game.

In some embodiments, the method further comprises determining if use of the protected asset is allowed if the protected asset is not available; and searching for content similar to the protected asset if use of the protected asset is allowed, wherein said updating the game data comprises indicating the content for use in the instances of the wagering game if the content is found.

In some embodiments, the current real-life data comprises one or more of sporting event data, reality television show event data, athletic performance data, and political event data.

In some embodiments, the method further comprises determining that the wagering game is associated with a data source of the current real-life data; and determining one or more update actions associated with the wagering game and the data source; wherein said updating the game data of the wagering game comprises performing the one or more determined update actions.

In some embodiments, said acquiring the current real-life data comprises acquiring configuration data, wherein the configuration data piggybacks the current real-life data.

In some embodiments, a method comprises acquiring current real-life data about at least one of a current event and a public figure from a data source; parsing the current real-life data based, at least in part, on the data source; determining a set of one or more wagering games associated with the data source; updating game data for the one or more wagering games in accordance with the parsed current real-life data; determining a plurality of wagering game machines that host instances of the one or more wagering games; and indicating the updated game data to the plurality of wagering game machines that host respective instances of the one or more wagering games.

In some embodiments, the method further comprises determining the data source.

In some embodiments, the method further comprises determining a parse function associated with the data source, wherein said parsing is in accordance with the parse function.

In some embodiments, the method further comprises determining an encoding scheme associated with the data source for the current real-life data, wherein said parsing is in accordance with the determined encoding scheme.

In some embodiments, one or more machine-readable media encoding instructions, which, when executed by a set of one or more processors, causes the set of one or more processors to perform operations that comprise updating wagering game data for a wagering game based, at least in part, on current real-life data to reflect in the wagering game a change in a current event associated with the wagering game; and propagating the updated game data over a network to instances of the wagering game on wagering game machines.

In some embodiments, the operations further comprise acquiring the current real-life data from a data source.

In some embodiments, the operations further comprise parsing the current real-life data.

In some embodiments, the operations further comprise determining the wagering game machines that host instances of the wagering game.

In some embodiments, an apparatus comprises a set of one or more processors; a network interface; and means for reflecting changes in a current event in a wagering game associated with the current event.

In some embodiments, said means for reflecting the changes in a current event comprise means for acquiring current data about the current event; and means for updating game data of the wagering game based, at least in part, on the current data.

In some embodiments, the apparatus further comprises means for propagating the updated game data to wagering game machines that host instances of the wagering game.

In some embodiments, the apparatus further comprises means for determining whether a protected asset is available for use in the wagering game, wherein the protected asset corresponds to the current event.

In some embodiments, a network of machines comprises a wagering game server that updates game data for a wagering game based, at least in part, on current real-life data about at least one of a current event and a public figure, that determine a plurality of wagering game machines that host instances of the wagering game, and that generates an indication of the update of the game data for the wagering game; and the plurality of wagering game machines that detect the indication of the update and that update the respective instances of the wagering game in accordance with the updated game data.

In some embodiments, the wagering game server also acquires the current real-life data from a remote data source.

In some embodiments, the wagering game server determines that the remote data source is associated with the wagering game and one or more actions to perform to update the game data for the wagering game.

In some embodiments, the wagering game server also parses the acquired current real-life data.

In some embodiments, the network further comprises a second wagering game server that determines whether a protected asset is available and can be used for the game data, wherein the wagering game server determines that the current real-life data implicates the protected asset.

BRIEF DESCRIPTION OF THE FIGURES

Embodiments of the invention are illustrated in the Figures of the accompanying drawings in which.

DESCRIPTION OF THE EMBODIMENTS

The description that follows includes exemplary systems, methods, techniques, instruction sequences and computer program products that embody techniques of the present inventive subject matter. However, it is understood that the described embodiments may be practiced without these specific details. In other instances, well-known instruction instances, protocols, structures and techniques have not been shown in detail in order not to obfuscate the description. Furthermore, the description utilizes indications of stages to aid in illustrating various examples. Indications of stages are intended to aid in understanding embodiments and do not indicate a required order of operations.

Wagering games can utilize current data about real-life (e.g., current events, public figures (e.g., political figures, athletes, movie/television stars, reality television contestants), etc.) to invigorate the wagering games. Utilizing the current real-life data invigorates the wagering games by dynamically changing various wagering game attributes (e.g., aesthetics, winning criteria, game mathematics and/or logic, etc.) to reflect real-life, which can include any one or more of current sports events, athletic performances, reality television shows, political races, etc. A dynamic current wagering game that reflects current events maintains a contemporary and relevant wagering game experience for players, as well as provides a familiar context to players. A system that supports dynamic current wagering games determines the relevancy of each injection of current real-life data and distributes wagering game data updates accordingly.

Figure 1:
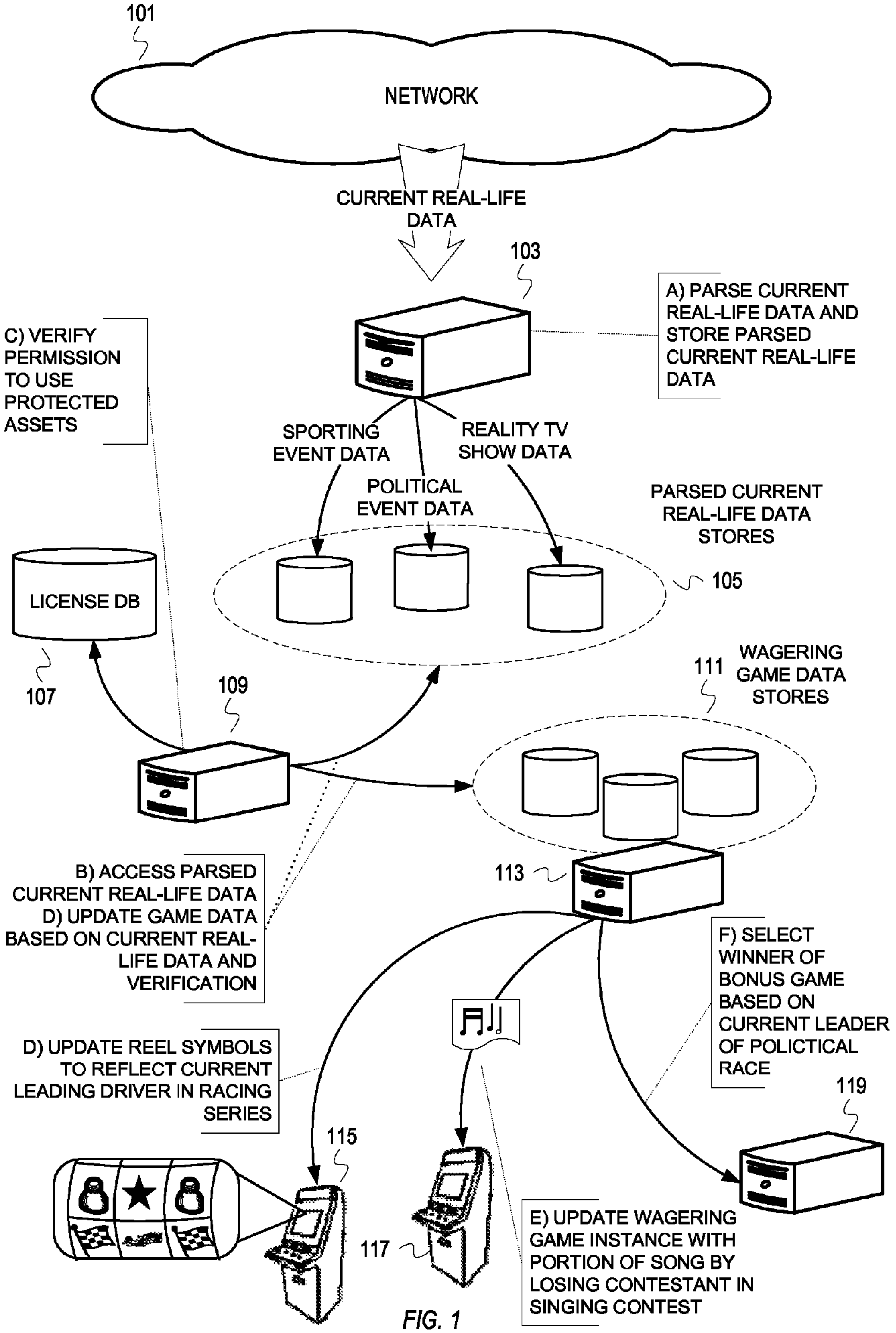
FIG. 1 depicts a conceptual example of updating wagering game data based on current real-life data.

FIG. 1 depicts a conceptual example of updating wagering game data based on current real-life data. In FIG. 1, wagering game servers 103, 109, and 113 operate to process current real-life data, and to update game data of wagering games instantiated on wagering game machines 115 and 117 based on the current real-life data. The wagering game server 103 acquires, parses, and communicates current real-life data. The wagering game server 103 acquires current real-life data via a network 101. At a stage A, the wagering game server 103 parses the current real-life data and stores the parsed current real-life data into parsed current real-life data stores 105. In this illustration, the current real-life data comprises sporting event data, political event data, and reality television show data. The data can be provided from a source over the network 101 as a single stream that is parsed into the different types of data, can be provided on different channels, can be provided individually from one or more sources, etc. The wagering game server 103 stores the parsed sporting event data, the parsed political event data, and the parsed reality television show data on different ones of the stores 105. A variety of implementations of the stores 105 are possible (e.g., partitions on a store, network attached storage, shared storage at one of the wagering game servers, virtual storage aggregated over separate physical stores, etc.).

The wagering game server 109 accesses the parsed current real-life data stores 105 and a license database 107. The wagering game server 109 accesses the stores 105 and to update game data. At a stage B, the wagering game server 109 accesses the parsed current real-life data stores 105. The wagering game server 109 determines the appropriate updates to game data in accordance with the parsed current real-life data. Current real-life data can implicate protected assets. Examples of protected assets include depictions of a famous person, assets protected by copyright (e.g., visual assets, aural assets, statistical assets, etc.), assets protected by trademark laws, etc. If a protected asset is implicated, the wagering game server 109 accesses the license database 107. With the data in the license database 107, the wagering game server 109 verifies that a gaming establishment and/or wagering game manufacturer has permission to use the one or more protected assets implicated by the parsed current real-life data. For example, the wagering game server 109 determines that the parsed current real-life data implicates 1) an image of a new driver who currently leads a racing series, 2) a portion of song of a current loser of a reality television show singing contest, and 3) an image of a current leader in a political race. The wagering gamer server 109 uses the license database to verify permission to use the images and the portion of the song.

At a stage C, the wagering game server 109 updates wagering game data on wagering game data store 111 based on the parsed current real-life data and the verification. The wagering game server 109 may update values, update flags, update pointers, etc. To continue the above example, the wagering game server 109 activates and/or stores the image of the leading driver, the portion of the song of the losing contestant, and the image of the current leader.

The wagering game server 113 propagates the updated game data to the appropriate wagering game machines. In FIG. 1, the wagering game server 113 causes reel symbols of a wagering game instance on a wagering game machine 115 to be updated with the images of the leading driver in the racing series. The wagering game server 113 also causes the reel symbols to be updated with an image of the leading driver's racing automobile. The wagering game server 113 updates an instance of a wagering game on a wagering game machine 117 to play the portion of the song of the losing contestant when player loses. The wagering game machine 113 also updates an instance of a bonus game hosted by a wagering game server 119. A winner of the bonus game instance is selected based on the current leader of the political race. The wagering game server 113 also updates the bonus game instance to display the image of the political figure. As illustrated with FIG. 1, changes in current events propagate to wagering game instances resulting in a living wagering game.

The specific examples provided in FIG. 1 should not be used to limit embodiments. For instance, the update game data can take place at one or both of back-end stores and the wagering game machines. In addition, a push, pull, or hybrid model for updating wagering game data can be implemented. Wagering game machines can be notified that updated game data is available for download. As another example, a back-end server can push game data updates to wagering game machines when not active. Furthermore, a living wagering game system can acquire current real-life data in accordance with any one of a variety of models, formats, etc. To illustrate, a third party may provide updated wagering game data to back-end stores and/or servers of a gaming establishment. As another illustration, the wagering game or wagering game establishment can subscribe to different data feeds for current real-life data (e.g., a sports data channel, a political data channel, etc.). Moreover, a player may initiate update of wagering game data by requesting a live version of a wagering game, refresh of a wagering game instance, etc. The living wagering game system then fetches up to date data for the wagering game instance.

Figure 2:
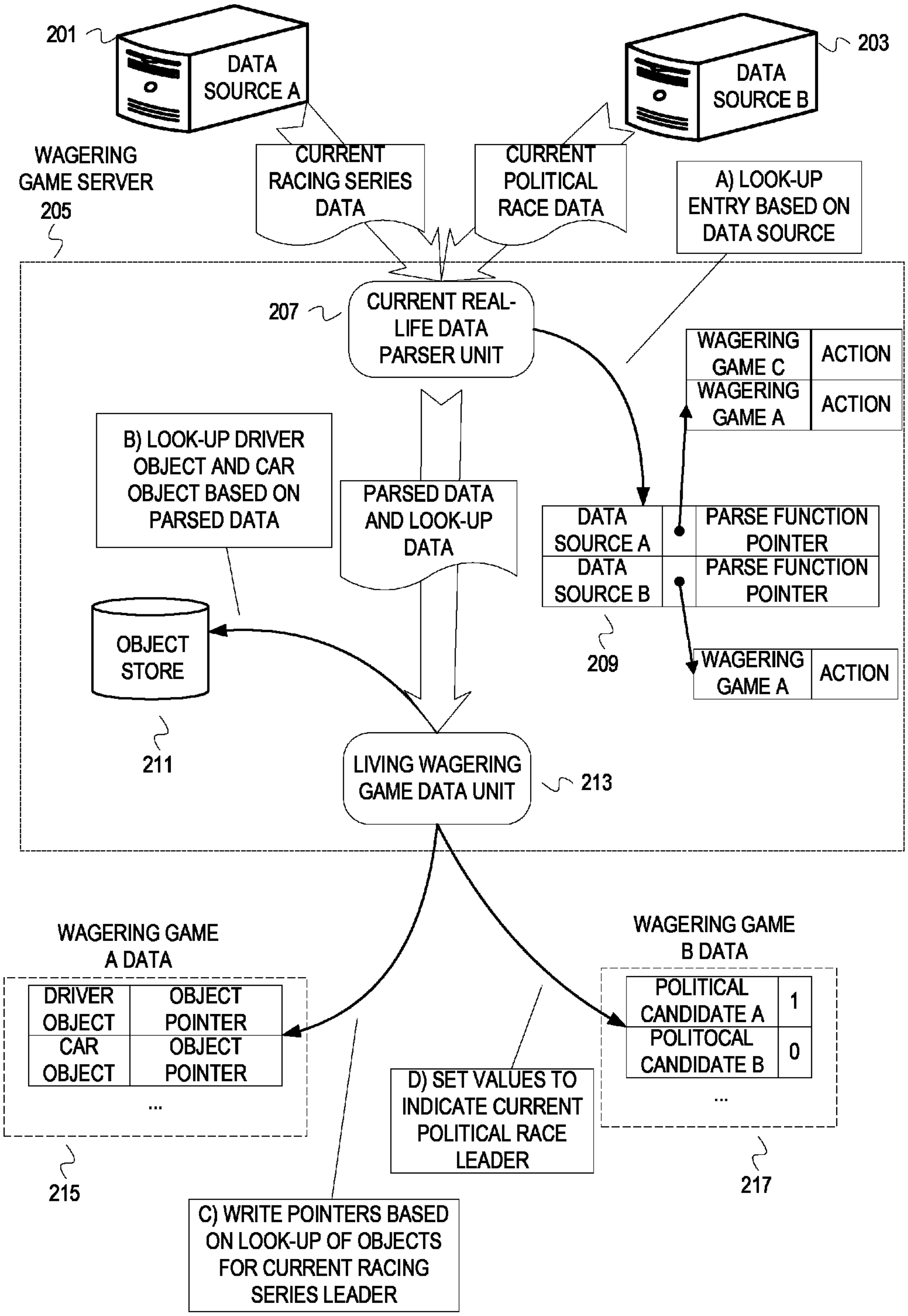
FIG. 2 depicts a conceptual example of processing current real-life data.

FIG. 2 depicts a conceptual example of processing current real-life data. A wagering game server 201 comprises a current real-life data parser unit 207 and a living wagering game data unit 213. The wagering game server 205 acquires current racing series data from a data source A 201 and current political race data from a data source B 203. The current real-life data parser unit 207 is aware of the data sources. For instance, the data is received on a particular socket, the data indicates data source, etc. At a stage A, the current real-life data parser unit 207 looks up an entry in a structure 209 based on the data sources 201 and 203. The structure 209 (e.g., a hash table, a tree, a hardware table, etc.) includes multiple entries. In this example, the table 209 includes respective entries the data source A and the data source B.

For the current racing series data, the current real-life data parser unit 207 looks up the data source A entry in the structure 209. The entry for the data source A associates the data source A with a parse function pointer and a reference to indications of wagering games and actions associated with the data source A. The parse function pointer references a function for parsing the current racing series data (e.g., based on format, content, etc. of the current racing series data). Wagering games A and C are associated with the data source A (e.g., wagering game A may use images from the racing series for reel symbols and wagering game C may use images and statistics from the racing series). Each wagering game has one or more actions for updating game data (e.g., set flag, upload image, etc.).

For the current political race data, the current real-life data parser unit 207 looks up the data source B entry in the structure 209. The entry for the data source B associates the data source B with a parse function pointer and a reference to indications of wagering games and actions associated with the data source B. The parse function pointer references a function for parsing the current political race data. A wagering game B is associated with the data source B. The wagering game B an actions defined for updating corresponding game data.

The current real-life data unit 207 parses with the respective functions referenced by the parse function pointers looked up in the structure 209. For instance, the current real-life data parser unit 207 parses the current political race data into indications of the political candidates and respective number of votes in the race. The current real-life data parser unit 207 parses the current racing series data into each competing driver following by respective current points. Embodiments can implement general parsing functionality in the current real-life data parser unit 207. The current real-life data unit can look up formatting in the structure 209 and parses in accordance with the formatting indicated in the structure 209. Embodiments can also assume a standard format for the current real-life data. The current real-life data parser unit 207 communicates the information looked up in the structure 209 to the living wagering game data unit 213 and the parsed current real-life data.

The living wagering game data unit 213 examines the information communicated by the current real-life data parser unit 207. The living wagering game data unit 213 determines that the action associated with the wagering game A indicates object look-up operations in an object store based on a driver with most points as indicated in the parsed racing series data. The living wagering game data unit 213 examines the parsed current racing series data, and identifies the driver with the most points. The living wagering game data unit 213 then accesses an object store 211 at a stage B. The living wagering game data unit 213 looks up a driver object (e.g., licensed image of the driver) and a car object (e.g., an image of the driver's car). The living wagering game data unit 213 determines that the action associated with the wagering game B indicates that a flag is to be set for the political candidate with the most votes. The living wagering game data unit 213 examines the parsed current political race data and determines that political candidate A has the most votes.

The living wagering game data unit 213 updates wagering game data after examining the parsed data and information communicated from the current real-life data parser unit 207. At a stage C, the living wagering game data unit 213 accesses wagering game A data 215, and writes pointers to reference the driver image and the car image objects looked up in the object store 211. At a stage D, the living wagering game data unit 213 accesses wagering game B data 217 to set values to indicate the current political race leader. The living wagering game data unit 213 sets a '1' for the political candidate A to identify the political candidate A as the current leader. The living wagering game data unit 213 writes a '0' for the political candidate B.

Figure 3:
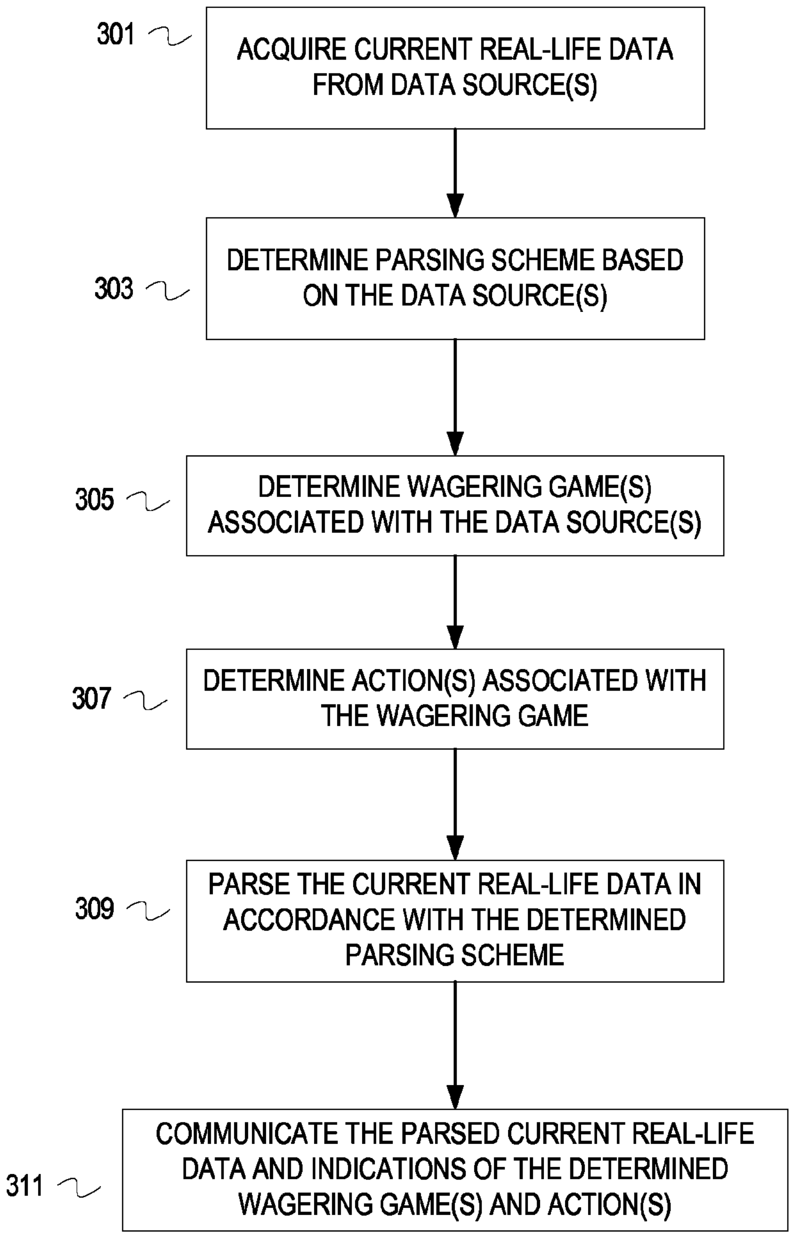
FIG. 3 depicts a flowchart of example operations for parsing current real-life data.
Figure 4:
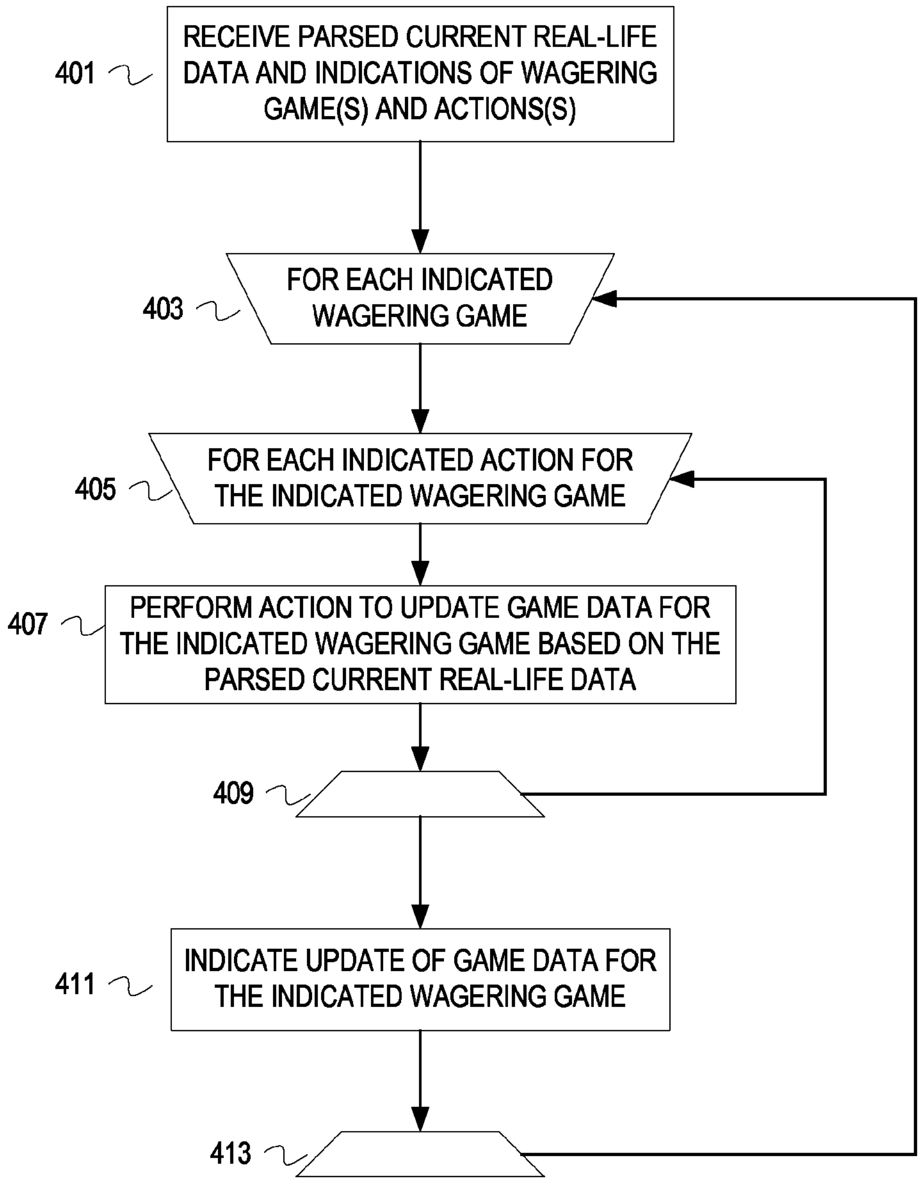
FIG. 4 depicts a flowchart of example operations for updating wagering game data.
Figure 5:
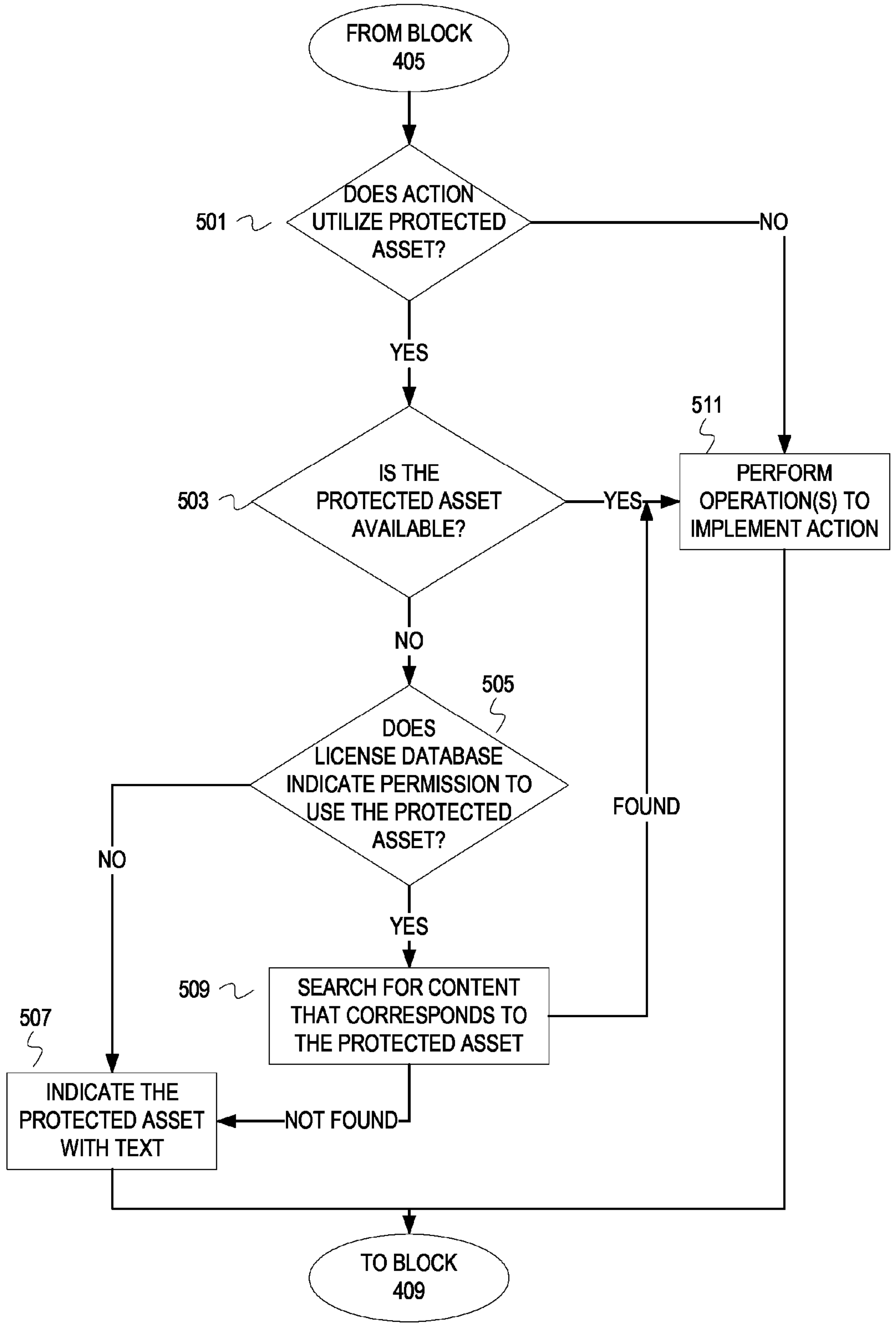
FIG. 5 depicts a flowchart of example operations for verifying permission to use a protected asset.

Although FIGS. 1 and 2 depict parsing of acquired current real-life data, embodiments can utilize current real-life data that is prepared and/or delivered in a manner that obviates parsing operations. The living wagering game data unit 213 could determine wagering games associated with a data source, and update game data based on the current real-life data without parsing. In addition, embodiments can perform different operations according to different implementation to process current real-life data and update wagering game data. FIGS. 3-5 depict flowcharts of example operations for processing current real-life data and updating wagering game data accordingly.

FIG. 3 depicts a flowchart of example operations for parsing current real-life data. At block 301, current real-life data is acquired from a data source(s). For example, current real-life data can be acquired from a service that streams current sports data. As another example, current real-life data can be scraped from various web sites. The depicted conceptual examples and the described examples represent only a few instances of the possible models for data acquisition. Variations arise with different protocols, connection settings, architectures, etc. For example, a server can acquire current real-life data from a File Transfer Protocol (FTP) based service, which can operate in passive mode, active mode, or extended passive mode. The provider of the FTP service and/or a wagering game establishment can require security credentials to establish the FTP connection. Various security measures can also be applied to the data acquisition technique being employed. Block 301 can include operations for the data source and a wagering game server to exchange security credentials before data is transmitted. As another example technique, a wagering game establishment and/or wagering game developer can provide the data source with security credentials and a destination address for the data source to put current real-life data.

At block 303, a parsing scheme is determined based on the data source(s). When a connection is established with the data source, the data source may indicate the formatting scheme of the current real-life data. An administrator can configure a system with a formatting scheme of the current real-life data from the data source. In addition, an intelligent parser can analyze current real-life data and presume a formatting scheme based, at least in part, on one or more heuristics.

At block 305, a wagering game(s) associated with the data source(s) is determined. A wagering game can be configured to automatically subscribe to any data feeds relevant to a particular reality television show, for example. An administrator can configure a system to associate the wagering game with a data source.

At block 307, an action(s) associated with the wagering game is determined. The action indicates one or more operations to be performed with the current real-life data to update the game data of the wagering game (e.g., search for images based on name of basketball player with lowest shooting percentage, modify wagering game variables to reflect demographic data of certain voters for a particular candidate, etc.).

At block 309, the current real-life data is parsed in accordance with the determined parsing scheme. For example, data is extracted from the current real-life data. Embodiments may reformat, order, etc., the current real-life data.

At block 311, the parsed current real-life data and indications of the determined wagering game(s) and action(s) are communicated. The parsed current real-life data and the indications can be communicated between different processes, threads, servers, integrated circuits, electronic devices, etc. Embodiments can also communicate the parsed current-real life data and indications to different entities. For example, a parser unit can communicate the parsed current real-life data to a process that stores the parsed current real-life data while the parser unit communicates the indications to a different device that updates game data.

FIG. 4 depicts a flowchart of example operations for updating wagering game data. At block 401, parsed current real-life data and indication of a wagering game(s) and an action(s) are received. Embodiments can pass the parsed current real-life data and the indications of the wagering game(s) and the action(s) referentially or literally to a process. For instance, a parser unit can pass an address to the parsed current real-life data to a process that updates wagering game data, and pass a data structure with the wagering game indication and the action indication. The indication of the action can be a piece of code passed for execution, a procedure call, a pointer to a function that implements the action, etc.

At block 403, a loop that includes blocks 405, 407, 409, and 411 begins for each indicated wagering game. At block 405, a loop that includes block 407 begins for each indication action for the indicated wagering game. At block 407, the indication action is performed to update game data for the indicated wagering game based on the parsed current real-life data. The same current real-life data can be used to perform different actions for different wagering games. Embodiments may delay performance of one or more of the determined actions. For example, the determined actions may include obtaining assets and then influencing game logic with the obtained assets. A system can obtain the assets in a first time period, but delay influencing the wagering game logic with the obtained assets until a later time (e.g., until an event occurs, time passes, a given amount of money is wagered, etc.). Block 409 terminates the loop begin at block 405. At block 411, the update of game for the indicated wagering game is indicated. For instance, a process transmits a notification or sets a flag to indicate the update. Embodiments can communicate the update to the instances of the wagering game on the wagering game machines. Embodiments can indicate the update to a back-end process that manages distribution and/or performance of updates to wagering game instances over a network. Block 413 terminates the loop of operations begun at block 403.

As stated earlier, update of game data may involve protected assets. The dynamic nature of business relationships can create some uncertainty with respect to rights in protected assets and/or availability of protected assets. For instance, a license agreement for official images of a particular public figure may not be complete until after a living wagering game is already active. The official images may be provided in anticipation of the agreement completing, but they cannot be utilized until the agreement completes. The living wagering can initially utilize simple indications (e.g., text, user created images of the public figure, etc.) until the license agreement completes. Once the agreement is complete, the living wagering game can then utilize the official images to enhance player experience.

FIG. 5 depicts a flowchart of example operations for verifying permission to use a protected asset. FIG. 5 depicts the example operations as a part of the operations performed to implement block 407 of FIG. 4. At block 501, it is determined if an indicated action utilizes a protected asset. For instance, the action may specifically indicate utilization of a protected asset. As another example, the action can specify a location to search for an image based on the parsed current real-life data. Embodiments can indicate and utilize protected assets with various techniques (e.g., the location may only host protected assets, the image may be flagged as a protected asset, etc.). If the action does not utilize a protected asset, then control flows to block 511. If the action does utilize a protected asset, then control flows to block 503.

At block 503, it is determined if the protected asset is available. For example, a protected asset is available if the protected asset is in a database accessible to the wagering game and/or a process associated with the wagering game. If the protected asset is available, then control flows to block 511. If the protected asset is not available, then control flows to block 505.

At block 505, it is determined if a license database indicates permission to use the protected asset. Embodiments can implement the license database with a variety of techniques. The license database can be implemented as a store of searchable agreements. For example, a process can search the license database for a name of an organization or public figure extracted from the parsed current real-life data. If the name is found, then the process searches an associated store of protected assets for use as wagering game data. Although the wagering game may have permission to use the protected asset, the protected asset might not be available. As another example, the license database can be implemented as a store with entries for each protected asset that can be utilized. The store, however, may not yet have the protected asset. So an entry exists that implies (or explicitly indicates) permission to use the protected asset, but the protected asset has not been received, created, etc. If the database indicates permission to use the protected asset, then control flows to block 509. If the database does not indicate permission to use the protected asset, then control flows to block 507. Although a license database is described, embodiments can indicate permission to use a protected asset, as well as store and indicate protected assets with various techniques (e.g., single directory, a database and a directory, searching across multiple network drives that host agreements, etc.).

At block 507, the protected asset is indicated with text. For example, a name of a current leader in a dance contest may be displayed instead of the official photo of the current leader. Embodiments are not limited to text as an alternative to a protected asset. Embodiments can utilize a generic symbol or graphic to display for figures when permission to use the protected asset is not allowed. From block 507, control flows to block 409 of FIG. 4.

At block 509, content that corresponds to the protected asset is searched for. For example, a process can search for an outline of a dancer and apply the current dancing leader's name to the outline. As another example, a process can search for a freely available user created sketch of the current dancing leader. If content is found that corresponds to the protected asset, then control flows to block 511. If content is not found, then control flows to block 507.

At block 511, an operation(s) is performed to implement the action. For instance, the action may direct a process to search for an audio file using the name of a singing contest loser as a query. Example operations to implement the action include searching the parsed current real-life data for the name, determining a location of audio game data, building a query, and submitting the query using the name to a process that manages the store of audio game data. Control flows from block 511 to block 409 of FIG. 4.

It should be understood that although FIG. 5 depicts the example operation in the context of FIG. 4, the operations can be performed independent of FIG. 4. For instance, a separate unit or module can analyze parsed current real-life data to determine if it implicated protected assets and then verify permission to use any implicated protected assets.

In embodiments, the operations can be performed by executing instructions residing on machine-readable media (e.g., software), while in other embodiments, the operations can be performed by hardware and/or other logic (e.g., firmware). It should be understood that the depicted flow diagrams are examples meant to aid in understanding embodiments and should not be used to limit embodiments or limit scope of the claims. Embodiments may perform additional operations, fewer operations, operations in a different order, operations in parallel, and some operations differently. Referring to FIG. 3, block 309 can be performed before blocks 305 and 307. In addition, blocks 305 and 307 can be performed independent of blocks 303 and 309. Operations depicted in block 311 can be split into different blocks. Additional operations can be performed to acquire data when an event occurs that interferes with acquiring the current real-life data. For instance, a data source may be aware of a pending interruption in delivery of current real-life data. The data source can notify a server that acquires the current real-life data of the pending interruption, and identify an alternate data source. As another example, alternative data sources can be configured and/or communicated in advance. When the server detects some interference (e.g., expiration of a given time period since a last update, lack of an acknowledgement to a keep-alive packet, etc.), the server can access a predefined alternative data source. Referring to FIG. 5, blocks 503 and 505 could be merged into a single block. In addition, different operations may be performed when a protected asset is not available/permitted for use. For example, driver A may be the current leader in a racing series. The wagering game developer and/or gaming establishment may only have licenses to images of drivers B, C, and D. Operations can be performed to select game data for the next highest ranked driver if protected assets for driver A are not available or permitted for use. Moreover, operations may be performed to aggregate game data that is a mixture of protected assets, unprotected assets, and/or from different sources.

Operations can also be performed to implement various security measures. Referring to FIG. 3, embodiments may perform additional operations to decrypt current real-life data prior to parsing. In addition, embodiments can implement multiple levels of security. For example, a data source and a wagering game establishment and/or wagering game developer may agree that different types of data will be subject to different levels of encryption (e.g., 64 bit for a first type of data and 128-bit for a second type of data, triple DES for a first type of data and AES for a second type of data, etc.). Embodiments can also parse data into encrypted elements, which are decrypted and then possibly parsed again.

Wagering Game Machine Architectures

Figure 6:
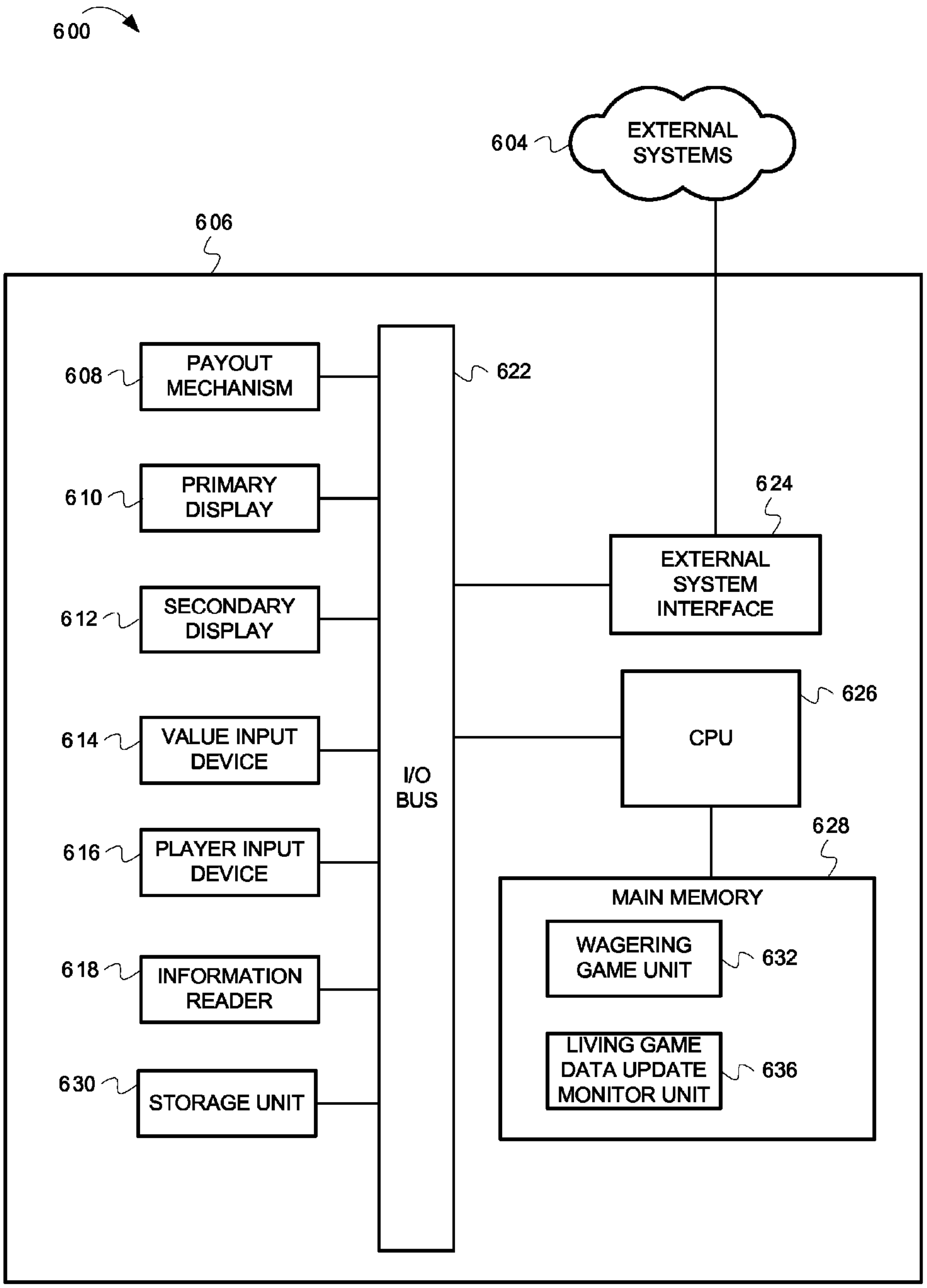
FIG. 6 is a block diagram illustrating a wagering game machine architecture, according to example embodiments of the invention.

FIG. 6 is a block diagram illustrating a wagering game machine architecture, according to example embodiments of the invention. As shown in FIG. 6, the wagering game machine architecture 600 includes a wagering game machine 606, which includes a central processing unit (CPU) 626 connected to main memory 628. The CPU 626 can include any suitable processor, such as an Intel® Pentium processor, Intel® Core 2 Duo processor, AMD Opteron™ processor, or UltraSPARC processor. The main memory 628 includes a wagering game unit 632. In one embodiment, the wagering game unit 632 can present wagering games, such as video poker, video black jack, video slots, video lottery, etc., in whole or part. The main memory 628 also embodies a living game data update monitor unit 636. The living game data update monitor unit 636 performs operations to update game data of a living wagering game instantiated on the wagering game machine depicted in FIG. 6. The living game data update unit 636 can wait for notifications of updates and/or periodically access a remote store to determine if game data has been updated. Embodiments can also implement the living game data update monitor unit 636 to search for game data updates in response to user requests and/or living wagering game events (e.g., the wagering game converts to a living wagering game after winning a threshold amount).

The CPU 626 is also connected to an input/output (I/O) bus 622, which can include any suitable bus technologies, such as an AGTL+frontside bus and a PCI backside bus. The I/O bus 622 is connected to a payout mechanism 608, primary display 610, secondary display 612, value input device 614, player input device 616, information reader 618, and storage unit 630. The player input device 616 can include the value input device 614 to the extent the player input device 616 is used to place wagers. The I/O bus 622 is also connected to an external system interface 624, which is connected to external systems 604 (e.g., wagering game networks).

In one embodiment, the wagering game machine 606 can include additional peripheral devices and/or more than one of each component shown in FIG. 6. For example, in one embodiment, the wagering game machine 606 can include multiple external system interfaces 624 and/or multiple CPUs 626. In one embodiment, any of the components can be integrated or subdivided.

Embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer usable program code embodied in the medium. The described embodiments may be provided as a computer program product, or software, that may include a machine-readable medium having stored thereon instructions, which may be used to program a computer system (or other electronic device(s)) to perform a process according to embodiments, whether presently described or not, since every conceivable variation is not enumerated herein. A machine readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions. In addition, embodiments may be embodied in an electrical, optical, acoustical or other form of propagated signal (e.g., carrier waves, infrared signals, digital signals, etc.), or wireline, wireless, or other communications medium.

Wagering Game Networks

Figure 7:
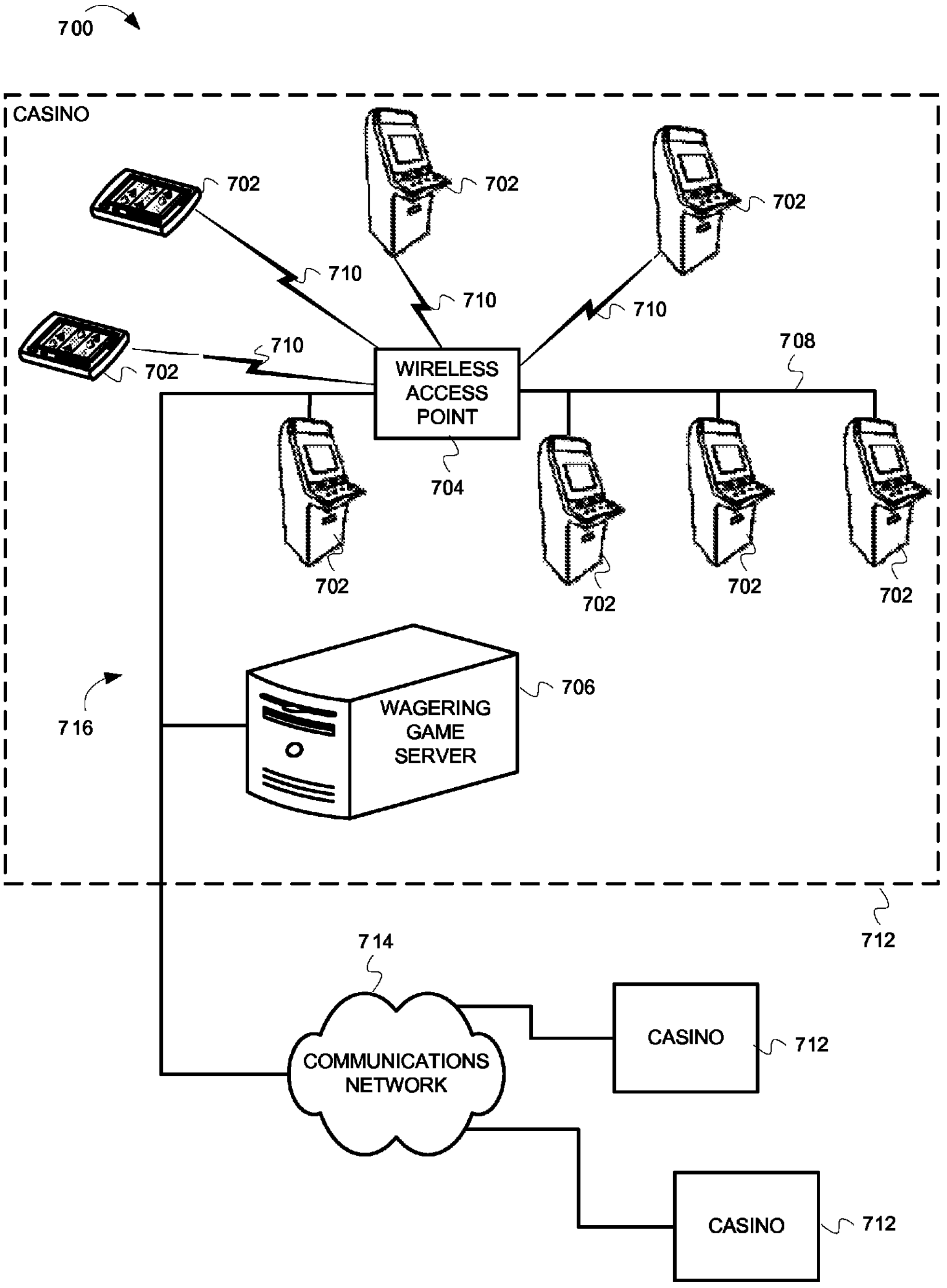
FIG. 7 is a block diagram illustrating a wagering game network 700, according to example embodiments of the invention.

FIG. 7 is a block diagram illustrating a wagering game network 700, according to example embodiments of the invention. As shown in FIG. 7, the wagering game network 700 includes a plurality of casinos 712 connected to a communications network 714.

Each casino 712 includes a local area network 716, which includes an access point 704, a wagering game server 706, and wagering game machines 702. The access point 7304 provides wireless communication links 710 and wired communication links 708. The wired and wireless communication links can employ any suitable connection technology, such as Bluetooth, 802.11, Ethernet, public switched telephone networks, SONET, etc. In some embodiments, the wagering game server 706 can serve wagering games and distribute content to devices located in other casinos 712 or at other locations on the communications network 714.

The wagering game machines 702 described herein can take any suitable form, such as floor standing models, handheld mobile units, bartop models, workstation-type console models, etc. Further, the wagering game machines 702 can be primarily dedicated for use in conducting wagering games, or can include non-dedicated devices, such as mobile phones, personal digital assistants, personal computers, etc. In one embodiment, the wagering game network 700 can include other network devices, such as accounting servers, wide area progressive servers, player tracking servers, and/or other devices suitable for use in connection with embodiments of the invention.

In some embodiments, wagering game machines 702 and wagering game servers 706 work together such that a wagering game machine 702 can be operated as a thin, thick, or intermediate client. For example, one or more elements of game play may be controlled by the wagering game machine 702 (client) or the wagering game server 706 (server). Game play elements can include executable game code, lookup tables, configuration files, game outcome, audio or visual representations of the game, game assets or the like. In a thin-client example, the wagering game server 706 can perform functions such as determining game outcome or managing assets, while the wagering game machine 702 can present a graphical representation of such outcome or asset modification to the user (e.g., player). In a thick-client example, the wagering game machines 702 can determine game outcomes and communicate the outcomes to the wagering game server 706 for recording or managing a player's account.

In some embodiments, either the wagering game machines 702 (client) or the wagering game server 706 can provide functionality that is not directly related to game play. For example, account transactions and account rules may be managed centrally (e.g., by the wagering game server 706) or locally (e.g., by the wagering game machine 702). Other functionality not directly related to game play may include power management, presentation of advertising, software or firmware updates, system quality or security checks, etc.

Any of the wagering game network components (e.g., the wagering game machines 702) can include hardware and machine-readable media including instructions for performing the operations described herein.

The examples have been described only with respect to current real-life data acquisition. Systems, however, can utilize a connection that carries current real-life ("current real-life data channel") to carry other data in either direction.

Figure 8:
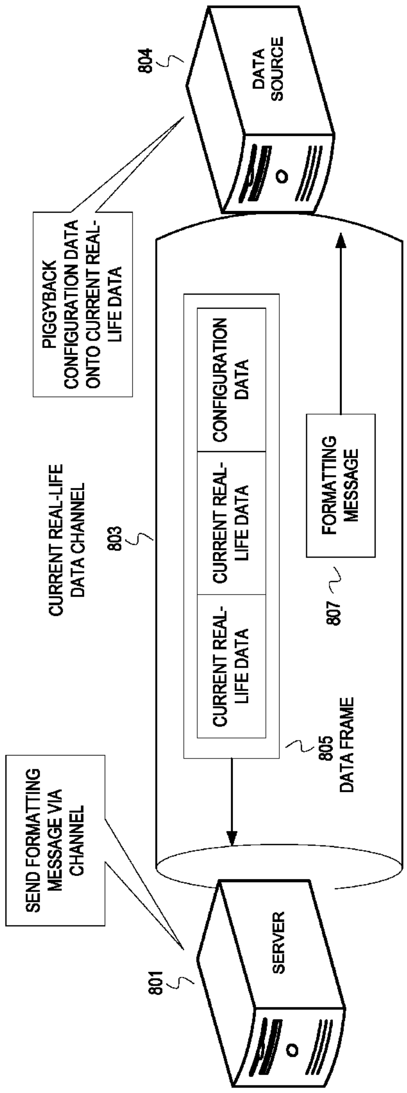
FIG. 8 depicts a conceptual example for utilizing a current real-life data channel for back-channel communicaitons and piggybacking.

FIG. 8 depicts a conceptual example for utilizing a current real-life data channel for back-channel communications and piggybacking A server 801 and a data source 804 establish a current real-life data channel 803. The data source 804 transmits a data frame 805 comprised of current real-life data and configuration data, which may or may not relate to the current real-life data. The configuration data piggybacks the current real-life data in the data frame 805. Piggybacking allows a wagering game developer, third party add-on developer, etc., to take advantage of the architecture, security, etc. established for the current real-life data channel 803. For example, the configuration data may be a configuration script, update, patch, new game logic, new wagering bonus game, etc. The configuration data may be executed before, after, in parallel, etc. with any action performed that corresponds to the current real-life data.

The server 801 also uses the current real-life data channel 803 to transmit a formatting message 807. The formatting message 807 can communicate a variety of messages. For example, the formatting message 807 can indicate that the server 801 expects to start receiving data formatted in accordance with a different formatting scheme. As another example, the formatting message 807 can communicate to the data source 804 that a wagering game establishment expects a different security scheme to be utilized.

General

This detailed description refers to specific examples in the drawings and illustrations. These examples are described in sufficient detail to enable those skilled in the art to practice the inventive subject matter. These examples also serve to illustrate how the inventive subject matter can be applied to various purposes or embodiments. Other embodiments are included within the inventive subject matter, as logical, mechanical, electrical, and other changes can be made to the example embodiments described herein. Features of various embodiments described herein, however essential to the example embodiments in which they are incorporated, do not limit the inventive subject matter as a whole, and any reference to the invention, its elements, operation, and application are not limiting as a whole, but serve only to define these example embodiments. This detailed description does not, therefore, limit embodiments of the invention, which are defined only by the appended claims. Each of the embodiments described herein are contemplated as falling within the inventive subject matter, which is set forth in the following claims.

The invention claimed is:

1. A method comprising:
- acquiring current real-life data about at least one of a current event and a public figure;
- updating game data for a wagering game based, at least in part, on the acquired current real-life data, the game data including instances of an object representing a randomly determinable element of the wagering game;
- modifying instances of the object representing the randomly determinable element of the wagering game to reference at least one of an image and audio that corresponds to the current real-life data, wherein the instances of the object are used at a plurality of wagering game machines to present the instances of the wagering game;
- determining the plurality of wagering game machines that host instances of the wagering game; and
- indicating over a network the updated game data to the plurality of wagering game machines that host instances of the wagering game.

2. The method of claim 1 further comprising collecting the current real-life data.

3. The method of claim 1, wherein the randomly determinable element of the wagering game comprises a reel symbol.

4. The method of claim 1, wherein said modifying the instances of the object comprises at least one of setting a flag in the instances of the object to allow use of the at least one of the image and the audio, changing a pointer to reference the at least one of the image and the audio, and overwriting at least one of a currently used image and a currently used audio.

5. The method of claim 1 further comprising:
- accessing a database of licensing information, which governs use of protected assets that comprise visual and audio assets; and
- determining that a first of the protected assets, which corresponds to the current real-life data, is available for use based, at least in part, on said accessing the database of licensing information, wherein said updating the game data includes indicating the first of the protected assets for use in the instances of the wagering game at the plurality of wagering game machines.

6. The method of claim 5 further comprising:
- determining that use of a second of the protected assets is not allowed based, at least in part, on said accessing the database of licensing information, wherein the second of the protected assets also corresponds to the current real-life data; and
- searching for content similar to the second of the protected assets,
- wherein said updating the game data comprises indicating the content for use in the instances of the wagering game at the plurality of wagering game machines.

7. The method of claim 1, wherein the current real-life data comprises one or more of sporting event data, reality television show event data, athletic performance data, and political event data.

8. The method of claim 1 further comprising:
- determining that the wagering game is associated with a data source of the current real-life data; and
- determining one or more update actions associated with the wagering game and the data source;
- wherein said updating the game data of the wagering game comprises performing the one or more determined update actions.

9. The method of claim 1 further comprising acquiring configuration data that corresponds to the wagering game, wherein the configuration data piggybacks the current real-life data via a secure channel established between a server that receives the current real-life data and a remote data source of the current real-life data.

10. A method comprising:
- acquiring current real-life data about at least one of a current event and a public figure from a data source;
- parsing the current real-life data based, at least in part, on the data source;
- determining a set of one or more wagering games associated with the data source;
- updating game data for the one or more wagering games in accordance with the parsed current real-life data, the game data including instances of an object representing a randomly determinable element of the set of one or more wagering games;
- modifying instances of the object representing the randomly determinable element of the set of one or more wagering games to reference at least one of an image and audio that corresponds to the current real-life data, wherein the instances of the object are used at a plurality of wagering game machines to present the instances of the wagering game;
- determining the plurality of wagering game machines that host instances of the one or more wagering games; and
- indicating the updated game data to the plurality of wagering game machines that host respective instances of the one or more wagering games.

11. The method of claim 10 further comprising determining the data source.

12. The method of claim 10 further comprising determining a parse function associated with the data source, wherein said parsing is in accordance with the parse function.

13. The method of claim 10 further comprising determining an encoding scheme associated with the data source for the current real-life data, wherein said parsing is in accordance with the determined encoding scheme.

14. One or more non-transitory machine-readable media encoding instructions, which, when executed by a set of one or more processors, causes the set of one or more processors to perform operations that comprise:

detecting a change in a current event associated with a wagering game, the current event determined from current real-life data generated externally from the wagering game;

updating wagering game data to indicate at least one of a visual game asset and an aural game asset for the wagering game to reflect the change in the current event, wherein the at least one of the visual game asset and the aural game asset is associated with a randomly determinable game element, and further wherein the at least one of the visual asset and the aural asset corresponds to the current event; and propagating the at least one of the visual game asset and the aural game asset for the wagering game over a network to instances of the wagering game hosted at a plurality of wagering game machines.

15. The one or more non-transitory machine-readable media of claim 14, wherein the operations further comprise acquiring the at least one of the visual game asset and the aural game asset from a data source that supplies an indication of the change in the current event, wherein a secure channel is established between the data source and a server associated with the plurality of wagering game machines.

16. The one or more non-transitory machine-readable media of claim 15, wherein the operations further comprise:

receiving data that comprises the indication of the change in the current event;

parsing the data;

determining that the at least one of the visual game asset and the aural game asset correspond to the change in the current event based, at least in part, on said parsing the data.

17. The one or more non-transitory machine-readable media of claim 15, wherein the operations further comprise extracting configuration data and the at least one of the visual game asset and the aural game asset from the data supplied from the data source, wherein the configuration data comprises one of an add-on, patch, configuration script, game logic, and a Previously Presented wagering game bonus.

18. An apparatus comprising:

a set of one or more processors;

a network interface; and means for determining at least one of an image and an audio that corresponds to at least one of a current event and a public figure in accordance with parsed current real-life data received over a secure channel established between the apparatus and a source of the current real-life data, wherein the parsed current real-life data indicates an update that corresponds to the at least one of the current event and the public figure; and means for updating, via a network, instances of the wagering game on a plurality of wagering game machines to utilize the at least one of the image and the audio as part of a randomly determinable game element presented in the instances of the wagering game.

19. The apparatus of claim 18, wherein said means for updating comprises:

means for modifying instances of objects of the wagering game used by the instances of the wagering game to indicate the at least one of the image and the audio.

20. The apparatus of claim 18 further comprising means for parsing the current-real life data based, at least in part, on information about the source of the current real-life data.

21. The apparatus of claim 18 further comprising means for determining that the at least one of the image and the audio is protected and licensed for use to an entity associated with the plurality of wagering game machines.

22. A network of machines comprising:

a wagering game server, that updates game data for a wagering game based, at least in part, on current real-life data about at least one of a current event and a public figure in response to receiving the current real-life data over a secure channel established between the wagering game server and a data source external to the network, wherein the current real-life data indicates an update that corresponds to the at least one of the current event and the public figure, that determines a plurality of wagering game machines that host instances of the wagering game, and that generates an indication of the update of the game data for the wagering game; and the plurality of wagering game machines that detect the indication of the update and that update the respective instances of the wagering game in accordance with the updated game data wherein the update of the respective instances includes incorporating at least one of an image and an audio that corresponds to the current real-life data into a randomly determinable game element presentable during an instance of the wagering game.

23. The network of claim 22, wherein the wagering game server updates the game data for the wagering game comprises the wagering game server indicating at least one of a first image and a first audio to replace a second image or a second audio currently used in the wagering game, wherein the second image or the second audio are out of date with respect to the at least one of the current event and the public figure.

24. The network of claim 22, wherein the wagering game server updates the game data for the wagering game comprises the wagering game indicating at least one of a first image and a first audio to use in the wagering game in addition to at least one of a second image and a second audio currently used in the wagering game, wherein the at least one of the second image and the second audio also correspond to the at least one of the current event and the public figure.

25. The network of claim 22, wherein the wagering game server also determines a parse function associated with the data source and calls the parse function to parse the current real-life data.

26. The network of claim 22 further comprising a second wagering game server that determines a protected asset is available for use for the update in the instances of the wagering game in accordance with licensing information that governs use of the protected asset by an entity associated with the plurality of wagering game machines.

* * * * *